(12) United States Patent
Jang et al.

(10) Patent No.: US 7,182,501 B2
(45) Date of Patent: Feb. 27, 2007

(54) BACKLIGHT UNIT

(75) Inventors: Myong Gi Jang, Seoul (KR); Hee Jung Hong, Seoul (KR); Hak Mo Hwang, Suwon-shi (KR)

(73) Assignee: LG.Phillips LCD Co., Ltd., Seoul (KR)

( * ) Notice: Subject to any disclaimer, the term of this patent is extended or adjusted under 35 U.S.C. 154(b) by 86 days.

(21) Appl. No.: 11/137,394

(22) Filed: May 26, 2005

(65) Prior Publication Data

US 2005/0265025 A1    Dec. 1, 2005

(30) Foreign Application Priority Data

May 28, 2004  (KR)  .................. 10-2004-0038343

(51) Int. Cl.
  *H01R 33/00*  (2006.01)
  *F21V 11/00*  (2006.01)
  *F21V 13/00*  (2006.01)
  *F21V 7/04*   (2006.01)

(52) U.S. Cl. .................. 362/651; 362/240; 362/243; 362/614

(58) Field of Classification Search .............. 362/651, 362/240, 33, 97, 561, 243
  See application file for complete search history.

(56) References Cited

U.S. PATENT DOCUMENTS 5,971,567 A * 10/1999 Van Duijneveldt .......... 362/296
6,626,562 B2    9/2003 Blanchard
2004/0062034 A1 * 4/2004 Hsieh et al. .................. 362/97
2005/0073858 A1 * 4/2005 Kim et al. .................. 362/561
2005/0088587 A1 * 4/2005 Pan et al. ..................... 349/65
2005/0195619 A1 * 9/2005 Tseng ......................... 362/561

FOREIGN PATENT DOCUMENTS

| JP | 7-169309 A    | 7/1995  |
| JP | 2002-93230 A  | 3/2002  |
| WO | WO-01/79922 A1 | 10/2001 |

* cited by examiner

*Primary Examiner*—Renee Luebke
*Assistant Examiner*—Evan Dzierzynski
(74) *Attorney, Agent, or Firm*—Birch, Stewart, Kolasch, & Birch, LLP (57) ABSTRACT

A backlight unit for enhancing the luminance uniformity is provided. The backlight unit includes a plurality of fluorescent lamps arranged in a light-emitting surface, each of the plurality of fluorescent lamps having a bent structure; and at least one conic-shaped structures for reflecting an incident light, the conic-shaped structure being surrounded by the bent structure of at least two of the plurality of fluorescent lamps.

38 Claims, 6 Drawing Sheets

BACKLIGHT UNIT

This Nonprovisional application claims priority under 35 U.S.C. §119(a) on Patent Application No. 10-2004-0038343 filed in Korea on May 28, 2004, the entire contents of which are hereby incorporated by reference.

BACKGROUND OF THE INVENTION

1. Field of the Invention

The present invention relates to a backlight unit, and more particularly, to a backlight unit having a lamp of a bent shape, to enhance the luminance uniformity in a backlight unit having a division structure.

2. Discussion of the Related Art

A cathode ray tube (CRT), one of flat display devices, has been widely used for monitors of a television, a measuring machine and an information terminal. However, the CRT cannot satisfy demands for a compact size and lightness in weight. Thus, display devices such as a liquid crystal display (LCD) device based on optoelectronic principles, a plasma display panel (PDP) using a gas discharge and an electroluminescence display (ELD) device based on an electric field luminous effect have been studied to substitute for the CRT.

Among those display devices, the LCD device has been most actively studied. The LCD device has the advantageous characteristics such as compact size, lightness and low power consumption, and is suitable for ultra-thin flat display devices, for example, monitors for spacecrafts, aircrafts, notebook computers, laptop computers, desktop computers and large-sized display devices. This explains the strong demand for the LCD devices today.

Most LCD devices control the light transmittance from ambient light to display images. To enhance the luminance, it is necessary to form an additional light source such as a backlight unit in an LCD panel. In general, the backlight unit used as the light source of the LCD device has a cylindrical fluorescent lamp, which is classified into two types, a direct type and an edge type, according to the arrangement of the fluorescent lamps.

For the edge type backlight unit, a lamp unit is provided at one side of a light-guiding plate. The lamp unit includes a lamp for emitting light, a lamp holder inserted into both ends of the lamp to protect the lamp, and a reflective sheet having one side inserted to the light-guiding plate and surrounding the circumference of the lamp, to reflect the light emitted from the lamp to the light-guiding plate. In this respect, the edge type backlight unit is generally applied to relatively small sized LCD devices such as the monitors of the laptop computer and the desktop computer, which is advantageous in that it has the features of great uniformity of light, long life span, and thin profile.

With trend of the large-sized LCD device of 20-inch or more, the direct type backlight unit is actively developed, in which a plurality of lamps are formed along one line on a lower surface of a light-diffusion sheet, whereby an entire surface of the LCD panel is directly illuminated with the light. The direct type backlight unit, which has greater light efficiency as compared with the edge type backlight unit, is used for the large-sized LCD device requiring high luminance. That is, the LCD device of the direct type backlight unit is generally used for the large-sized monitor or television. The large-sized monitor or television may be driven for a long time, and has a plurality of lamps. Accordingly, it is probable that some of the lamps may be out of order and do not emit light.

In case of the edge type backlight unit, even though one lamp fails, it only causes a slight decrease in luminance and will not significantly affect the luminance on the entire LCD panel. However, in case of the direct type LCD device, a plurality of lamps are provided underneath a screen of the LCD panel. Accordingly, if one of the lamps fails due to some reasons such as reaching the lifespan of lamp, a screen portion corresponding to the failed lamp becomes darker as compared with surrounding portions of the screen. Accordingly, it is necessary for the direct type LCD device to have a simple structure suitable for disassembly and assembly of the lamp unit.

Figure 1:
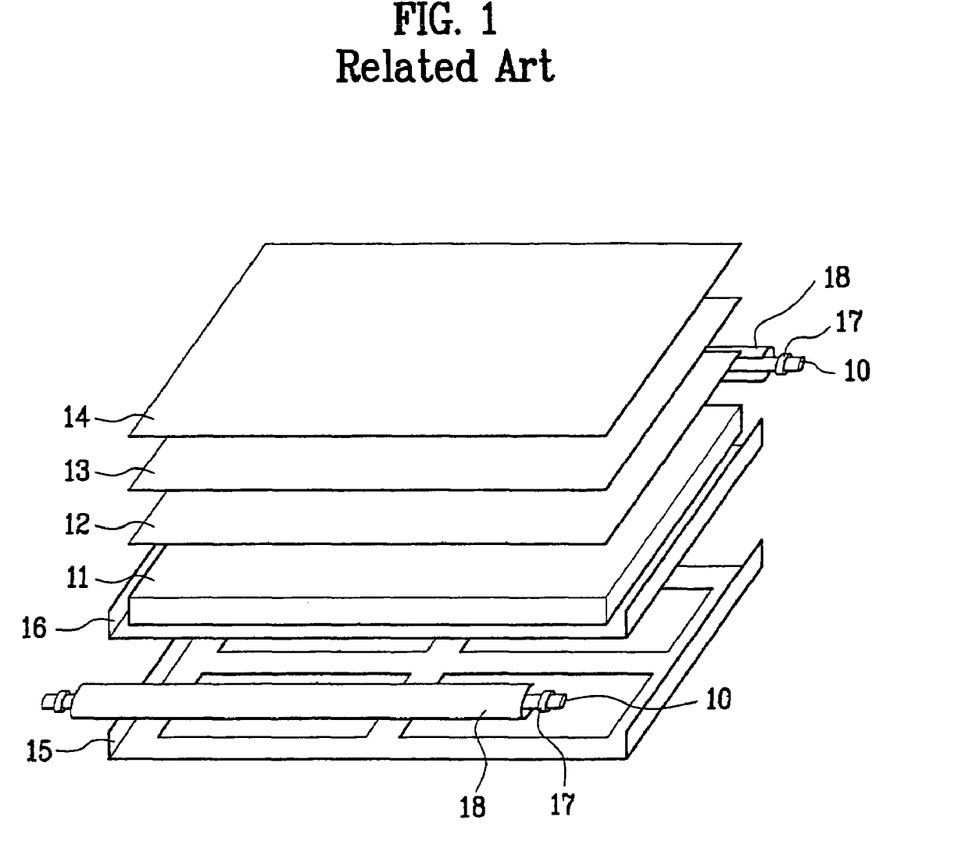
FIG. 1 is an exemplary view of an edge type backlight unit according to the related art.

Hereinafter, a related art backlight unit will be described with reference to the accompanying drawings. First, an edge type backlight unit according to the related art will be described as follows. FIG. 1 is an exemplary view of an edge type backlight unit according to the related art. As shown in FIG. 1, the edge type backlight unit according to the related art includes an LCD panel 14, a lamp 10, a light-guiding plate 11, a light-diffusion sheet 12, a prism sheet 13, a fixation structure 15, and a lower reflective sheet 16. The LCD panel 14 displays images thereon by controlling the light transmittance, and the lamp 10 is used as a light source. Also, the light-guiding plate 11 guides the incident light, emitted from the lamp 10, to the LCD panel 14. Then, the light-diffusion sheet 12 diffuses the light guided by the light-guiding plate 11 to a predetermined angle. The prism sheet 13 concentrates the diffused light, and sends the concentrated light to the rear of the LCD panel 14. Also, the fixation structure 15 is positioned below the light-guiding plate 11. To minimize the loss of light, the lower reflective sheet 16 reflects the light progressing toward the fixation structure 15 back to the LCD panel 14.

In addition, the edge type backlight unit according to the related art further includes lamp reflective sheets 18 and lamp holders 17. Each of the lamp reflective sheets 18 covers the lamp 10 except for a light-incidence surface of the light-guiding plate 11, thereby decreasing the loss of light incident to the light-incidence surface of the light-guiding plate 11 from the lamp 10. Also, the lamp holders 17 are positioned at both ends of the lamp 10, to fix the lamp 10 to a predetermined position, and to maintain a predetermined interval between the light-incidence surface of the light-guiding plate 11 and the lamp 10.

In the aforementioned edge type backlight unit, a plurality of light-diffusion sheets 12 and prism sheets 13 may be deposited. If the edge type backlight unit according to the related art is used for the monitor, each lamp 10 is positioned on both sides of the light-guiding plate 11. However, in case the lamp edge type backlight unit is used for the notebook computer, the lamp may be positioned on one side of the light-guiding plate 11.

Figure 2:
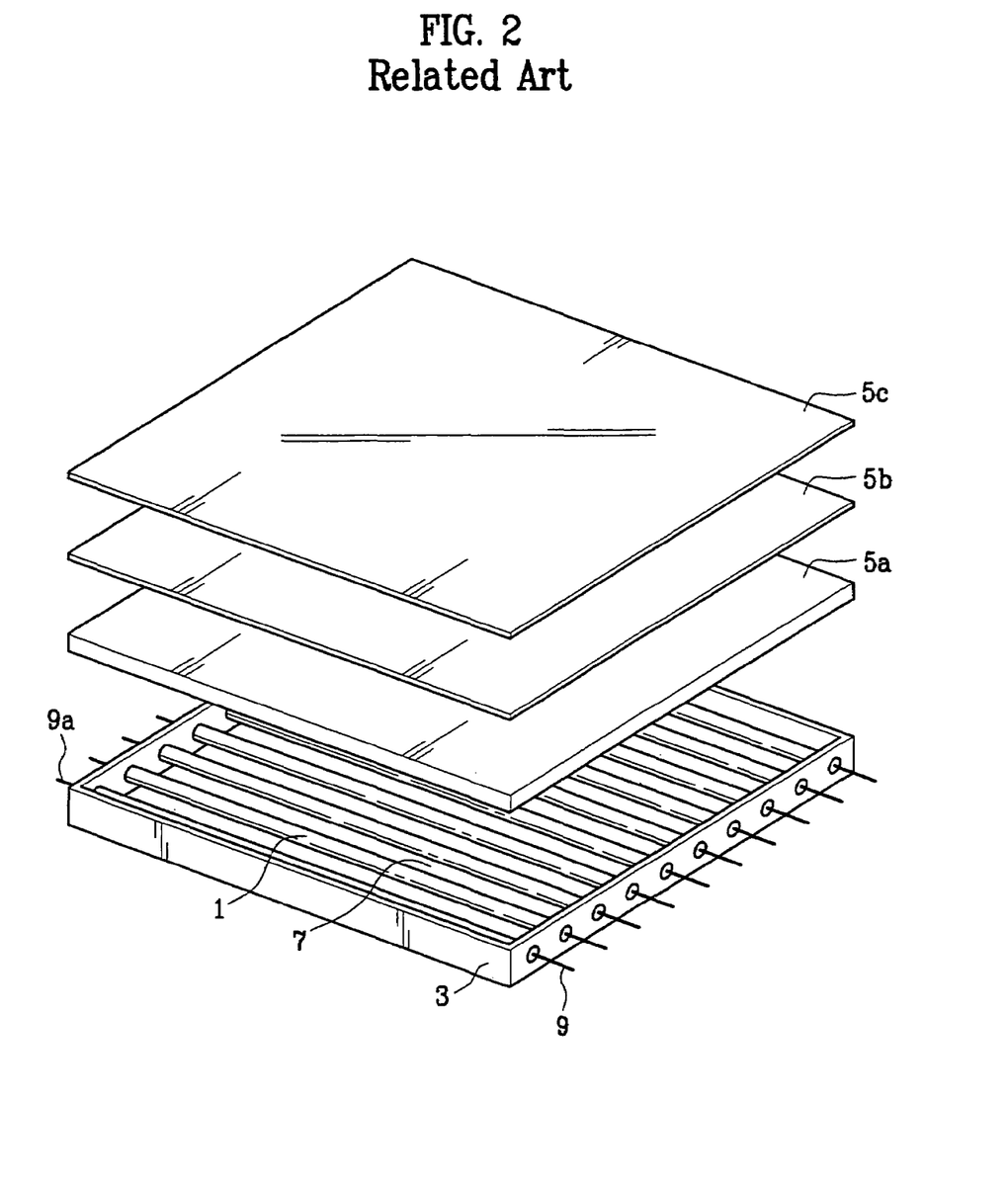
FIG. 2 is an exemplary view of a direct type backlight unit according to the related art.

In the meantime, a direct type backlight unit according to the related art will be described as follows. FIG. 2 is an exemplary view of a direct type backlight unit according to the related art. Referring to FIG. 2, the direct type backlight unit according to the related art includes a plurality of fluorescent lamps 1, an outer case 3, and light-scattering means 5a, 5b and 5c. The fluorescent lamps 1 are arranged at fixed intervals along one direction. The outer case 3 fixes and supports the fluorescent lamps 1. Then, the light-scattering means 5a, 5b and 5c are provided between the fluorescent lamps 1 and an LCD panel (not shown).

The light-scattering means 5a, 5b and 5c are used to prevent the silhouette of the fluorescent lamps 1 from being reflected on the display surface of the LCD panel (not shown), and provide a light source with uniform luminance.

To improve the light-scattering effect, there are a plurality of diffusion sheets and one diffusion plate between the fluorescent lamps 1 and the LCD panel. Also, a reflective sheet 7 is provided on an inner surface of the outer case 3 for reflecting the light emitted from the fluorescent lamps 1 to the display part of the LCD panel, thereby improving light efficiency.

At this time, the fluorescent lamps 1 are formed of Cold Cathode Fluorescent Lamps CCFL. Specifically, electrodes are formed at both ends of a tube in each of the fluorescent lamps 1. Accordingly, when a voltage is applied to the electrodes of the fluorescent lamps 1, the fluorescent lamps 1 emit the light. Also, the both ends of the fluorescent lamp 1 are respectively inserted to holes formed on both sides of the outer case 3.

Then, the both electrodes of the fluorescent lamp 1 are connected with power supplying wires 9 and 9a so that the power for operating the fluorescent lamp 1 can be supplied to the fluorescent lamp 1. The power supplying wires 9 and 9a are connected to a driving circuit by an additional connector. Thus, each fluorescent lamp 1 requires the individual connector. That is, the power supplying wire 9 connected to one electrode of the fluorescent lamp and the power supplying wire 9a connected to the other electrode of the fluorescent lamp are connected to a single connector. Also, any one of the power supplying wires 9 and 9a is curved to the lower side of the outer case 3 for being connected with the connector.

Figure 3:
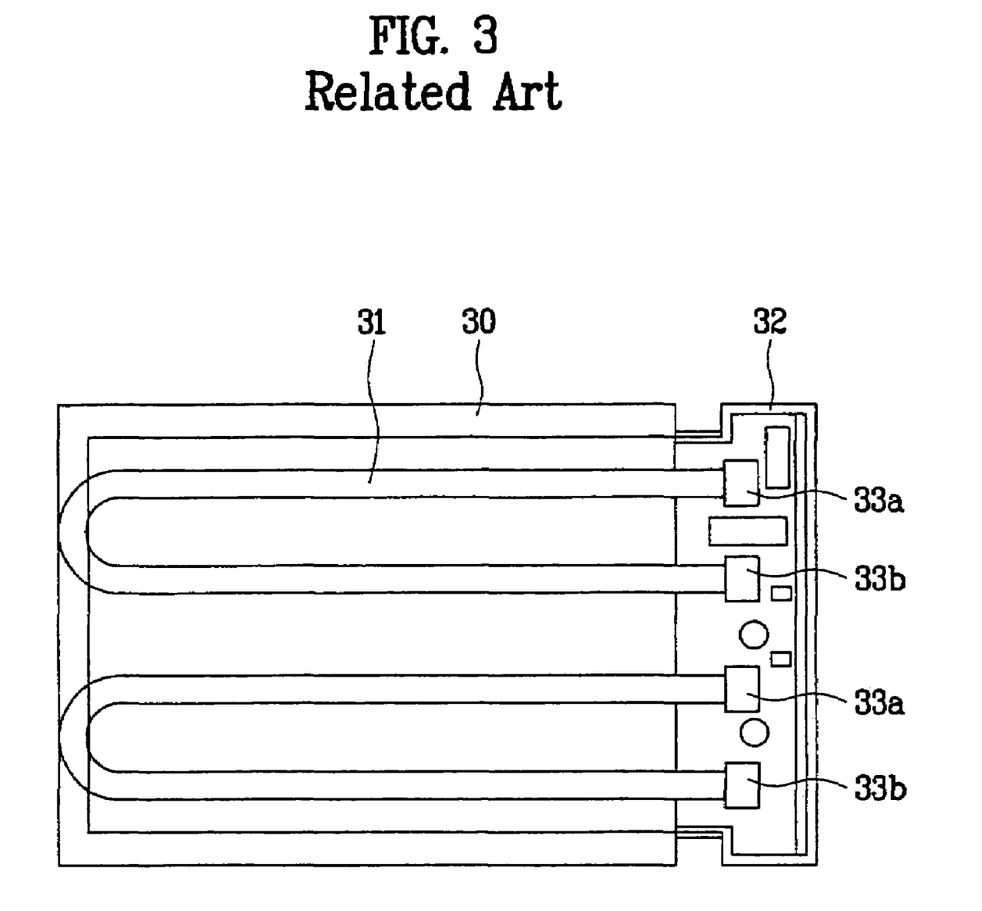
FIG. 3 is an exemplary view of another direct type backlight unit according to the related art.

FIG. 3 is an exemplary view of another direct type backlight unit according to the related art. As shown in FIG. 3, the direct type backlight unit uses a plurality of U-shaped fluorescent lamps 31. In each of the U-shaped fluorescent lamps 31, electrodes are formed at the both ends, wherein the electrodes are connected to respective connectors 33a and 33b of an inverter 32. In FIG. 3, an outer case 30 is provided for supporting the fluorescent lamps 31.

However, both the edge type backlight unit and the direct type backlight unit according to the related art have several disadvantages.

First, although the edge type backlight unit according to the related art can improve the uniformity of light with the light-scattering means 5a, 5b and 5c, it is impossible to control the luminance of displayed image in a particular region since it uses the light-guiding plate 11.

Although there are some methods for improving the picture quality, for example, a method of sequentially turning on the plurality of U-shaped fluorescent lamps 31, it still has the limitation controlling the luminance of a particular region of the screen. Furthermore, if the U-shaped fluorescent lamps 31 are partially overlapped to one another, the luminance may be lower in some particular regions.

SUMMARY OF THE INVENTION

Accordingly, the present invention is directed to a backlight unit that substantially obviates one or more problems due to limitations and disadvantages of the related art.

An object of the present invention is to provide a backlight unit having a bent shape, to enhance the luminance uniformity in a backlight unit having a division structure.

To achieve these objects and other advantages and in accordance with the purpose of the invention, a backlight unit includes a light-emitting surface divided into a plurality of regions; a plurality of fluorescent lamps arranged in the left and right divided regions, each fluorescent lamp having a bent structure; first and second inverters respectively arranged in the left and right sides of the light-emitting surface, wherein the respective first and second inverters have a plurality of connectors, to apply a voltage to the respective fluorescent lamps; an outer case for fixing and supporting the plurality of fluorescent lamps; conic-shaped structures arranged at the areas surrounded by the bent parts of the fluorescent lamps on the boundaries of the divided regions; and light-scattering means provided above the fluorescent lamps.

The fluorescent lamps arranged in the left regions of the light-emitting surface are respectively connected with the connectors of the first inverter, and the fluorescent lamps arranged in the right regions of the light-emitting surface are respectively connected with the connectors of the second inverter. The fluorescent lamps can be formed to have a '⊂' or '⊃' shape.

The conic-shaped structure can have a bottom size and/or a height different from those of the other conic-shaped structure, which are based on a size in the bent part of the fluorescent lamp, an interval between the bent parts of the adjacent fluorescent lamps, and a height of the outer case. In addition, the surface of the conic-shaped structure is formed of a reflective material.

In the left regions of the light-emitting surface, W-shaped fluorescent lamps are counterclockwise rotated at 90°, or M-shaped fluorescent lamps are clockwise rotated at 90°. In the right regions of the light-emitting surface, W-shaped fluorescent lamps are clockwise rotated at 90°, or M-shaped fluorescent lamps are counterclockwise rotated at 90°.

In case of dividing the light-emitting surface into six regions, in the two left regions of the light-emitting surface, W-shaped fluorescent lamps are counterclockwise rotated at 90°, or M-shaped fluorescent lamps are clockwise rotated at 90°. In the two right regions of the light-emitting surface, W-shaped fluorescent lamps are clockwise rotated at 90°, or M-shaped fluorescent lamps are counterclockwise rotated at 90°. In a middle region of lower and upper sides, interposed between the left and right regions, M-shaped and W-shaped fluorescent lamps are respectively provided.

In case of dividing the light-emitting surface into six regions, W-shaped fluorescent lamps are arranged along one line in the upper divided regions, M-shaped fluorescent lamps are arranged along one line in the lower divided regions, and third and fourth inverters, having a plurality of connectors, are respectively provided in correspondence with the upper and lower divided regions.

Also, the fluorescent lamp is formed of cold cathode fluorescent lamp CCFL, which has two electrodes at both ends in a tube thereof, and power supplying wires respectively connected with both electrodes, and the power supplying wires connected with the both electrodes are connected with one connector.

In another aspect, a backlight unit includes a plurality of fluorescent lamps arranged in symmetric with a central line, each fluorescent lamp having at least one bent part; a plurality of conic-shaped structures arranged along the central line; a case for supporting the plurality of fluorescent lamps and the plurality of structures; and light-scattering means for covering the case.

Furthermore, the backlight unit includes a plurality of inverters including connectors being electrically connected with both electrodes of the respective fluorescent lamps. Also, the respective structures are positioned adjacent to the bent parts of the fluorescent lamps arranged symmetrically with the central line. The fluorescent lamps can be formed in shape of U, W or M. Also, the both electrodes of the fluorescent lamp are positioned toward the inverter. The conic-shaped structure can have a bottom size and/or a height different from those of the other conic-shaped structure, which are based on a size in the bent part of the fluorescent lamp, an interval between the bent parts of the fluorescent lamps, and a height of the outer case.

Further scope of applicability of the present application will become more apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention and wherein.

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or similar parts.

Hereinafter, a backlight unit according to the preferred embodiment of the present invention will be described with reference to the accompanying drawings.

Figure 4:
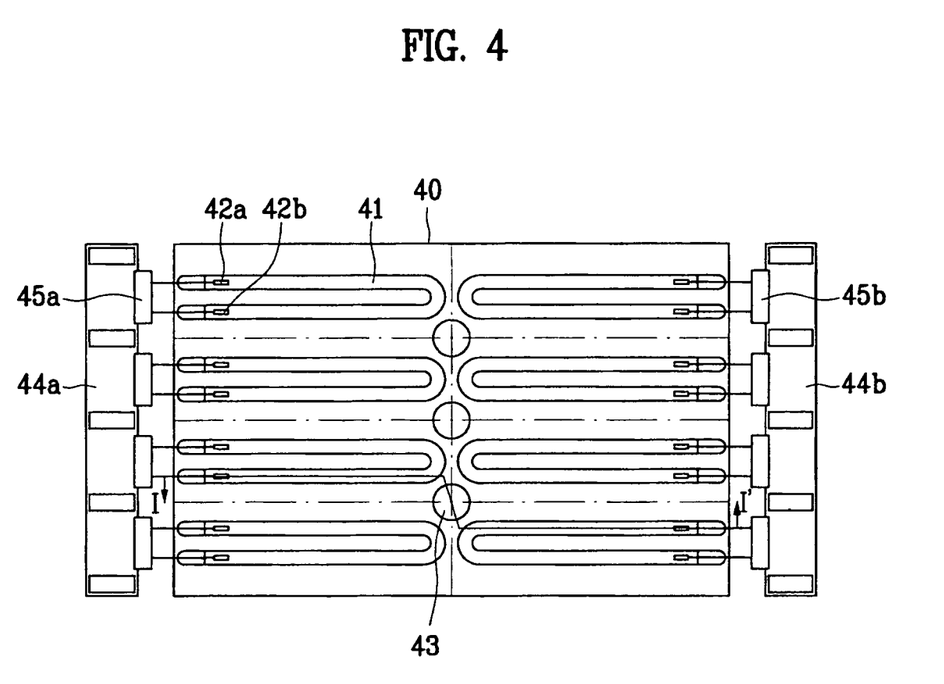
FIG. 4 is a plane view of a backlight unit having a division structure according to the first embodiment of the present invention.
Figure 5:
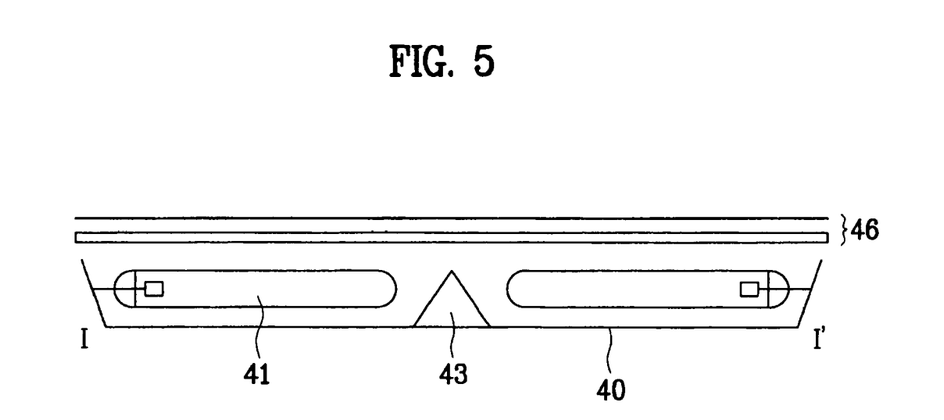
FIG. 5 is a cross-sectional view of a backlight unit along I–I' of FIG. 4.
Figure 6:
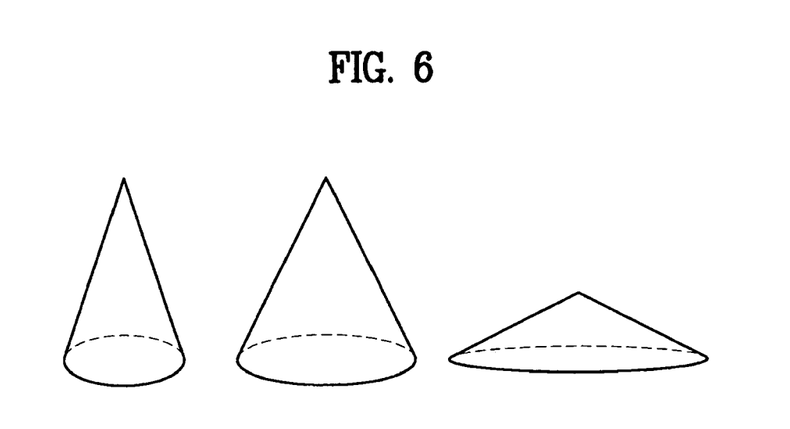
FIG. 6 is an exemplary view of embodiments of the conic-shape structure of FIG. 4.

FIG. 4 is a plane view of a backlight unit having a division structure according to the first embodiment of the present invention. FIG. 5 is a cross-sectional view of a backlight unit along I–I' of FIG. 4. FIG. 6 is an exemplary view of embodiments of the conic-shape structure of FIG. 4.

The backlight unit of the division structure according to one embodiment of the present invention has a light-emitting surface divided into a plurality of regions, for example, four divisions, six divisions and eight divisions, which will be described as follows.

In the backlight unit according to the first embodiment of the present invention, as shown in FIG. 4 and FIG. 5, the light-emitting surface is divided into eight regions. In this embodiment, a plurality of fluorescent lamps 41, each having a bent structure in a '⊃' shape (when the shape of U is counterclockwise rotated at 90°), are arranged in the left regions of the light-emitting surface. Also, a plurality of fluorescent lamps 41, each having a bent structure in a '⊂' shape (when the shape of U is clockwise rotated at 90°), are arranged in the right regions of the light-emitting surface. First and second inverters 44a and 44b are provided on both sides of the light-emitting surface, wherein the first and second inverters respectively include a plurality of connectors 45a and 45b for applying a voltage to the respective fluorescent lamps 41.

That is, the fluorescent lamps 41 arranged in the left regions are connected with the respective connectors 45a of the first inverter 44a, and the fluorescent lamps 41 arranged in the right regions are connected with the respective connectors 45b of the second inverter 44b.

In the aforementioned backlight unit having a plurality of fluorescent lamps, each lamp 41 has a bent structure. Since the light-emitting surface is divided into the eight regions, the object of partially controlling the luminance of a particular region can be achieved. However, the backlight unit may have the lower luminance at an area surrounded by the bent parts of the fluorescent lamps 41. Accordingly, conic-shaped structures 43 are additionally provided at the area surrounded by the bent parts of the respective fluorescent lamps 41 in order to maintain the uniformity of luminance. In the illustrated embodiment, the conic-shaped structures 43 are arranged on a boundary between the left regions and the right regions. As shown in FIG. 4, the boundary between the left regions and the right regions is a central line dividing the light-emitting surface into two equal regions. In the illustrated embodiment, each of the conic-shaped structures 43 is arranged at a crossing of a boundary between the left regions and the right regions and a boundary between two adjacent left regions (or two adjacent right regions).

In addition, an outer case 40 is provided to fix and support the fluorescent lamps 41. Also, light-scattering means 46 is additionally provided between the fluorescent lamps 41 and an LCD panel (not shown).

The light-scattering means 46 can prevent the silhouette of the fluorescent lamps 41 from being reflected on the display surface of the LCD panel (not shown), and provide a light source with uniform luminance. To improve the light-scattering effect, there are a plurality of diffusion sheets and one diffusion plate between the fluorescent lamps 41 and the LCD panel. Also, a reflective sheet (not shown) is provided on an inner surface of the outer case 40 for reflecting the light emitted from the fluorescent lamps 41 to the display part of the LCD panel, thereby improving light efficiency.

In this embodiment, the fluorescent lamps 41 are formed of Cold Cathode Fluorescent Lamps CCFL. Specifically, electrodes 42a and 42b are formed at both ends of a tube in each of the fluorescent lamps 41. Accordingly, when a voltage is applied to the electrodes 42a and 42b of the fluorescent lamps 41, the fluorescent lamps 41 emit the light Also, the both ends of the fluorescent lamp 41 are respectively inserted to holes formed on both sides of the outer case 40.

Then, the both electrodes 42a and 42b of the fluorescent lamp 41 are connected with power supplying wires to obtain the power for operating the fluorescent lamp 41. Herein, one power supplying wire connected to one electrode 42a of the fluorescent lamp 41 and the other power supplying wire connected to the other electrode 42b of the fluorescent lamp 41 are connected with a single connector.

In this embodiment, the fluorescent lamps 41 are formed in a '⊃' or '⊂' shape. Since both electrodes of each fluorescent lamp are on the same side, each of the fluorescent lamps 41 is connected with one connector without curving the power supplying wires to the lower side of the outer case 40. In this embodiment, the two electrodes of all fluorescent lamps in the left regions face the left direction. The two electrodes of all fluorescent lamps in the right regions face the right direction.

As shown in FIG. 6, the bottom size and the height of the conic-shaped structure 43 may be varied according to the size of the LCD panel, the size in the bent part of the surrounding fluorescent lamp 41, the interval between the bent parts of the adjacent fluorescent lamps 41, and the height of the outer case having the reflective sheet. Also, the surface of the structure 43 is formed of a reflective material, for example, the same material as the reflective sheet.

Figure 7:
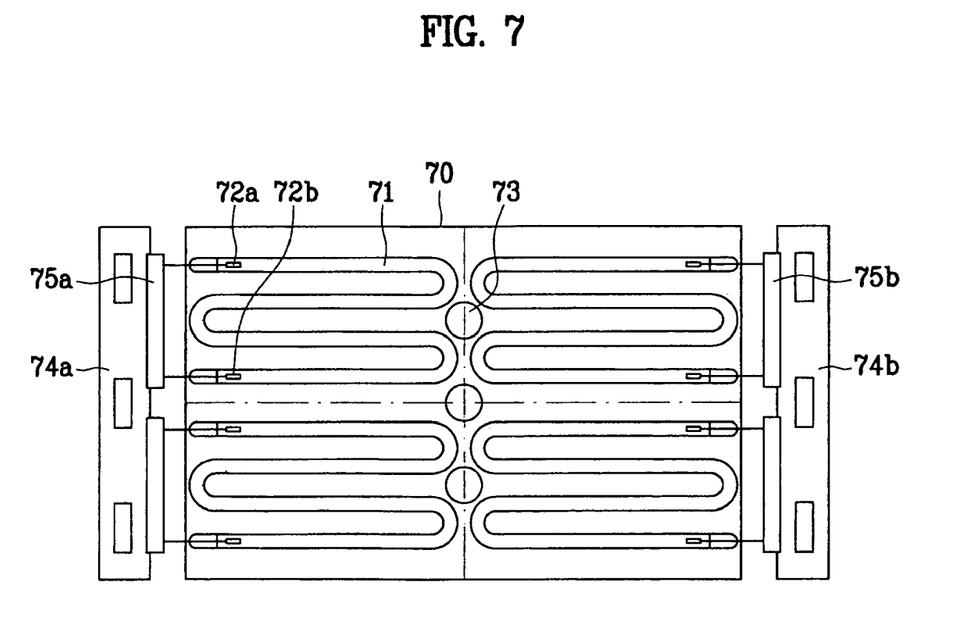
FIGS. 7–9 are exemplary views of various backlight units having respective structures according to the preferred embodiments of the present invention.
Figure 8:
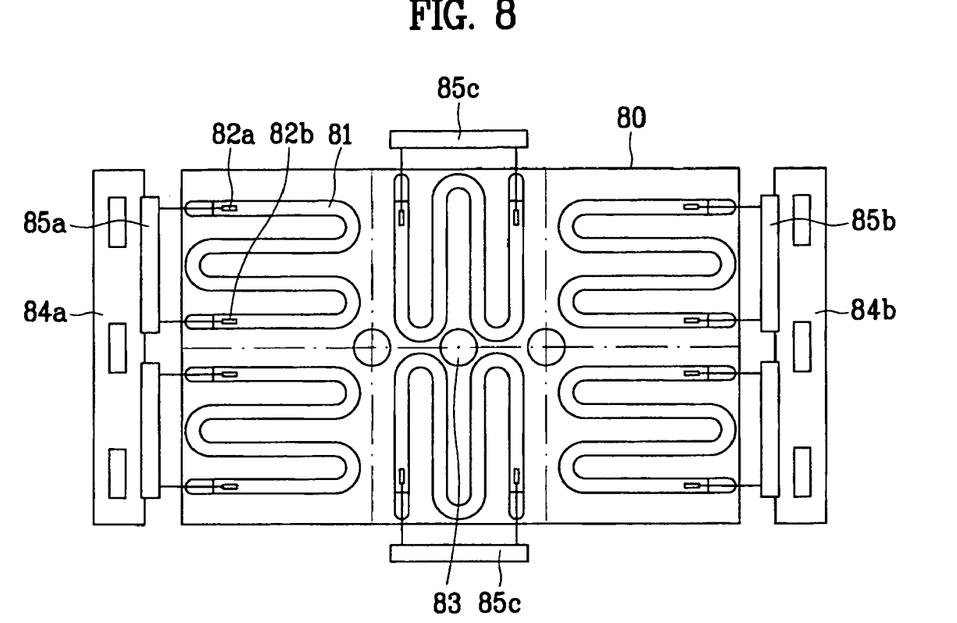
Figure 9:
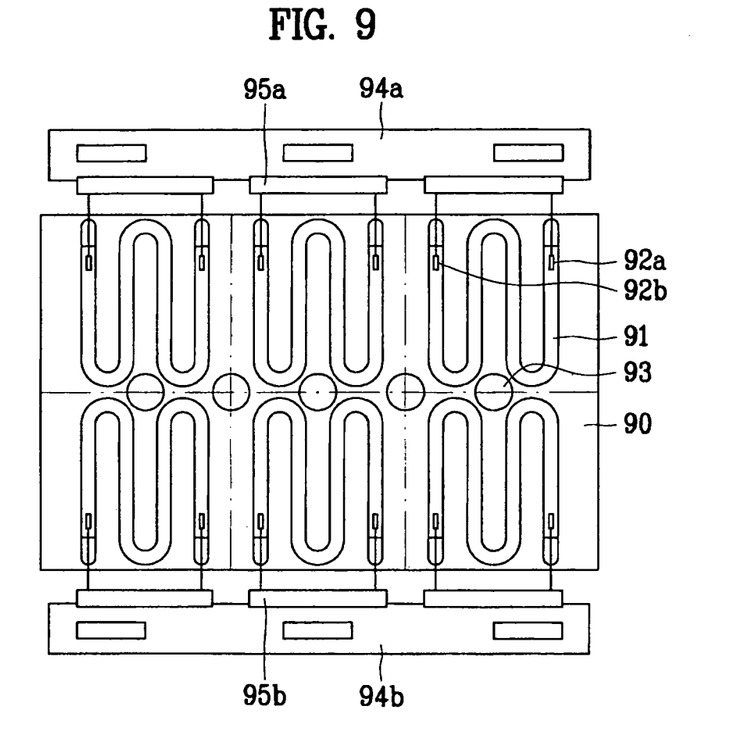

FIGS. 7–9 are exemplary views of various backlight units having respective structures according to the preferred embodiments of the present invention.

First, as shown in FIG. 7, a light-emitting surface is divided into four regions. Four fluorescent lamps 71 are arranged in the four regions of the light-emitting surface, respectively. Each of the fluorescent lamps 71 has a bent structure in a 'W' or 'M' shape. Two fluorescent lamps 71 are respectively arranged in the two left regions and the other two are respectively arranged in the two right region s. Also, first and second inverters 74a and 74b are provided on both sides of the light-emitting surface. The first inverter 74a includes a plurality of connectors 75a on the left side of the light-emitting surface, and the second inverter 74b includes a plurality of connectors 75b on the right side of the light-emitting surface, thereby applying a voltage to the respective fluorescent lamps 71.

Each region has one fluorescent lamp 71 therein. In this embodiment, the fluorescent lamps 71 arranged in the left regions are respectively connected with the connectors 75a of the first inverter 74a, and the fluorescent lamps 71 arranged in the right regions are respectively connected with the connectors 75b of the second inverter 74b.

Specifically, in the left regions of the light-emitting surface, the W-shaped fluorescent lamps 71 may be counterclockwise rotated at 90°, or the M-shaped fluorescent lamps 71 may be clockwise rotated at 90°. In the right regions of the light-emitting surface, the W-shaped fluorescent lamps 71 may be clockwise rotated at 90°, or the M-shaped fluorescent lamps 71 may be counterclockwise rotated at 90°. That is, the W-shaped or M-shaped fluorescent lamps 71 are arranged in symmetric with a central line for dividing the light-emitting surface into the left regions and the right regions. In this embodiment, the two electrodes of all fluorescent lamps in the left regions face the left direction. The two electrodes of all fluorescent lamps in the right regions face the right direction.

Furthermore, a plurality of structures 73, each having a conic shape, are provided at the areas surrounded by the bent parts of the fluorescent lamps 71, along the boundaries of the divided regions (the central line of the light-emitting surface). In this embodiment, one conic-shaped structure 73 is arranged at a crossing of a boundary between the left regions and the right regions and a boundary between two adjacent left regions (or two adjacent right regions). This conic-shaped structure 73 (the central one shown in FIG. 7) is surrounded by the convex part of four fluorescent lamps 71. In addition, each of the other two conic-shaped structures 73 is arranged in between a concave part of a fluorescent lamp in the left regions and a concave part of a fluorescent lamp in the right regions.

Like the fluorescent lamp according to the first embodiment of the present invention, the conic-shaped structure 73 is formed of a reflective material, for example, the same material as the reflective sheet.

In FIG. 7, an outer case 70 is provided for fixing and supporting the fluorescent lamps 71, and internal electrodes 72a and 72b are provided at both ends of the fluorescent lamp 71.

In FIG. 8, a backlight unit has a light-emitting surface divided into six regions. In addition to the left and right regions of FIG. 7, a middle region is additionally provided in the light-emitting surface. The middle region is divided into lower and upper regions. W-shaped or M-shaped fluorescent lamps 81 are formed in the middle lower and upper regions, and connectors 85c on the upper side and the lower side of the light-emitting surface are respectively provided to the middle lower and upper regions, to apply a voltage to the respective W-shaped or M-shaped fluorescent lamps 81. Additional inverters can be provided on the upper side and the lower side of the light-emitting surface with the connectors 85c. In the alternative, the connectors 85c can be connected to the inverters 84a or 84b.

A plurality of structures 83, each having a conic shape, are provided at the areas surrounded by the bent parts of the fluorescent lamps on the boundaries of the divided regions. Except that, the backlight unit of FIG. 8 is very similar to the backlight unit of FIG. 7 in structure. In this embodiment, two conic-shaped structures 83 are arranged at a crossing of the central line and a boundary between two adjacent left regions and at a crossing of the central line and two adjacent right regions, respectively. These two conic-shaped structures 83 (the left one and the right one shown in FIG. 8) are surrounded by the convex part of four fluorescent lamps 81. In addition, another conic-shaped structure 83 is arranged in between a concave part of a fluorescent lamp in the middle upper region and a concave part of a fluorescent lamp in the middle lower region.

In addition, in this embodiment shown in FIG. 8, the two electrodes of the fluorescent lamp in the right-lower region and the two electrodes of the fluorescent lamp in the right-upper region face the right direction. The two electrodes of the fluorescent lamp in the left-lower region face the left direction. The two electrodes of the fluorescent lamp in the middle lower and middle upper regions face the upper side and the lower side of the light-emitting surface.

In the meantime, as shown in FIG. 9, a light-emitting surface is divided into six regions. W-shaped or M-shaped fluorescent lamps 91 are respectively arranged in the divided six regions. First and second inverters 94a and 94b having a plurality of connectors 95a and 95b are provided on the upper and lower sides of the light-emitting surface, so that a voltage is applied to the respective fluorescent lamps 91.

The W-shaped fluorescent lamps 91 are arranged along one line in the upper divided regions of the light-emitting surface, and the M-shaped fluorescent lamps 91 are arranged along one direction in the lower divided regions of the light-emitting surface. That is, the fluorescent lamps 91, each having the bent structure in a W or M shape, are symmetrically arranged in the lower and upper regions. Also, the fluorescent lamps 91 arranged in the upper regions are connected with the respective connectors 95a of the first inverter 94a, and the fluorescent lamps 91 arranged in the lower regions are connected with the respective connectors 95b of the second inverter 94b.

In this embodiment, a plurality of structures 93, each having a conic shape, are provided at the areas surrounded by the bent parts of the fluorescent lamps 91 on the boundaries of the divided regions. In this embodiment, two conic-shaped structures 93 are arranged at a crossing of a boundary between the upper regions and the lower regions and a boundary between two adjacent upper regions (or two adjacent lower regions). These two conic-shaped structures 93 (the second left one and the second right one shown in FIG. 9) are surrounded by the convex part of four fluorescent lamps 91. In addition, each of the other three conic-shaped structures 93 is arranged in between a concave part of a fluorescent lamp in the upper regions and a concave part of a fluorescent lamp in the lower regions.

In this embodiment, the fluorescent lamps 91 are formed of cold cathode fluorescent lamps CCFL. Also, the surface of the structure 93 is formed of a reflective material, for example, the same material as the reflective sheet.

In FIG. 9, an outer case 90 is provided for fixing and supporting the fluorescent lamps 91, and internal electrodes 92*a* and 92*b* are provided at both ends of the fluorescent lamp 91.

In the backlight units of FIGS. 7–9, instead of the fluorescent lamp in shape of W or M, the fluorescent lamp may be formed in various shapes such as a wave shape having a plurality of concave and convex parts.

As described above, the backlight unit according to the preferred embodiment of the present invention has several advantages. In the backlight unit having the division structure according to the embodiments of the present invention, the conic-shaped structures are additionally provided at the area surrounded by the bent parts of the fluorescent lamps, thereby enhance the luminance uniformity on the boundaries of the divided regions. Accordingly, it can maintain the uniform luminance on the entire screen.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A backlight unit comprising:
 a plurality of fluorescent lamps, at least one of the plurality of fluorescent lamps being arranged in a first region and at least one of the plurality of fluorescent lamps being arranged in a second region of a light-emitting surface, each of the plurality of fluorescent lamps having a bent structure; and
 at least one conic-shaped structure for reflecting an incident light, the conic-shaped structure being arranged on a boundary between the first and second regions.

2. The backlight unit of claim 1, wherein an arrangement of the at least one fluorescent lamp in the first region is symmetrical to an arrangement of the at least one fluorescent lamp in the second region.

3. The backlight unit of claim 1, wherein the first region includes a plurality of first sub-regions, each of the plurality of first sub-regions having at least one of the plurality of fluorescent lamps and the conic-shaped structure being arranged at a crossing of the boundary between the first and second regions and a boundary between two adjacent first sub-regions.

4. The backlight unit of claim 3, wherein the boundary between the first and second regions is perpendicular to the boundary between the two adjacent first sub-regions.

5. The backlight unit of claim 3, wherein the conic-shaped structure is arranged between a convex part of each of two adjacent fluorescent lamps, the two adjacent fluorescent lamps being in the two adjacent first sub-regions, respectively.

6. The backlight unit of claim 1, wherein the conic-shaped structure is arranged between the at least one fluorescent lamp in the first region and the at least one fluorescent lamp in the second region.

7. The backlight unit of claim 6, wherein the conic-shaped structure is arranged between a concave part of the at least one fluorescent lamp in the first region and a concave part of the at least one fluorescent lamp in the second region.

8. The backlight unit of claim 6, wherein the first region includes a plurality of first sub-regions, each of the plurality of first sub-regions having at least one of the plurality of fluorescent lamps and another conic-shaped structure being arranged at a crossing of the boundary between the first and second regions and a boundary between two adjacent first sub-regions.

9. The backlight unit of claim 8, wherein the boundary between the first and second regions is perpendicular to the boundary between the two adjacent first sub-regions.

10. The backlight unit of claim 8, wherein the another conic-shaped structure is arranged between a convex part of each of two adjacent fluorescent lamps, the two adjacent fluorescent lamps being in the two adjacent first sub-regions, respectively.

11. The backlight unit of claim 1, wherein two electrodes of each of the plurality of fluorescent lamps face toward a same direction.

12. The backlight unit of claim 11, wherein the direction of the two electrodes of the at least one fluorescent lamp in the first region is the same as the direction of the two electrodes of another fluorescent lamp in the first region.

13. The backlight unit of claim 11, wherein the direction of the two electrodes of the at least one fluorescent lamp in the first region is opposite to the direction of the two electrodes of another fluorescent lamp in the first region.

14. The backlight unit of claim 11, wherein the direction of the two electrodes of the at least one fluorescent lamp in the first region is perpendicular to the direction of the two electrodes of another fluorescent lamp in the first region.

15. The backlight unit of claim 11, wherein the direction of the two electrodes of the at least one fluorescent lamp in the first region is the same as the direction of the two electrodes of the at least one fluorescent lamp in the second region.

16. The backlight unit of claim 11, wherein the direction of the two electrodes of the at least one fluorescent lamp in the first region is opposite to the direction of the two electrodes of the at least one fluorescent lamp in the second region.

17. The backlight unit of claim 11, wherein the direction of the two electrodes of the at least one fluorescent lamp in the first region is perpendicular to the direction of the two electrodes of the at least one fluorescent lamp in the second region.

18. The backlight unit of claim 11, further comprising a first inverter on a first side of the light-emitting surface, and a second inverter on a second side of the light-emitting surface opposite to the first side, each of the first and second inverters including at least one connector.

19. The backlight unit of claim 18, wherein the two electrodes of the at least one fluorescent lamp in the first region are connected to the at least one connector of the first inverter and the two electrodes of the at least one fluorescent lamp in the second region are connected to the at least one connector of the second inverter.

20. The backlight unit of claim 18, further comprising a third inverter on a third side of the light-emitting surface, and a fourth inverter on a fourth side of the light-emitting surface opposite to the third side, each of the third and fourth inverters including at least one connector, each of the third side and the fourth side being adjacent to the first side and the second side.

21. The backlight unit of claim 20, wherein the two electrodes of the at least one fluorescent lamp in the first region are connected to one of the at least one connector of the first inverter and the at least one connector of the third inverter, two electrodes of another fluorescent lamp in the first region are connected to the other one of the at least one connector of the first inverter and the at least one connector of the third inverter, the two electrodes of the at least one fluorescent lamp in the second region are connected to one of the at least one connector of the second inverter and the at least one connector of the fourth inverter, and two electrodes of another fluorescent lamp in the second region are connected to the other one of the at least one connector of the second inverter and the at least one connector of the fourth inverter.

22. The backlight unit of claim 1, further comprising light-scattering means located above the plurality of fluorescent lamps.

23. The backlight unit of claim 1, wherein each of the plurality of fluorescent lamps is of one of a U shape and a W shape.

24. The backlight unit of claim 1, wherein the surface of the conic-shaped structure is formed of a reflective material.

25. The backlight unit of claim 1, further comprising an outer case for fixing and supporting the plurality of fluorescent lamps.

26. The backlight unit of claim 1, wherein the conic-shaped structure has a bottom size and a height based upon a size in the bent structure of the fluorescent lamp surrounding the conic-shaped structure, an interval between the bent structures of the fluorescent lamps, and a height of the outer case.

27. A backlight unit comprising:
a plurality of fluorescent lamps arranged in a light-emitting surface, each of the plurality of fluorescent lamps having a bent structure; and
at least one conic-shaped structure for reflecting an incident light, the conic-shaped structure being surrounded by the bent structure of at least two of the plurality of fluorescent lamps.

28. The backlight unit of claim 27, wherein the bent structure includes at least one of a concave structure and a convex structure.

29. The backlight unit of claim 27, wherein each of the plurality of fluorescent lamps is of one of a U shape and a W shape.

30. The backlight unit of claim 27, wherein the surface of the conic-shaped structure is formed of a reflective material.

31. The backlight unit of claim 27, further comprising an outer case for fixing and supporting the plurality of fluorescent lamps.

32. The backlight unit of claim 27, wherein the conic-shaped structure has a bottom size and a height based upon a size in the bent structure of the fluorescent lamp surrounding the conic-shaped structure, an interval between the bent structures of the fluorescent lamps, and a height of the outer case.

33. A backlight unit comprising;
a plurality of fluorescent lamps arranged in symmetric with a central line, each fluorescent lamp having at least one bent part;
a plurality of conic-shaped structures arranged along the central line;
a outer case for supporting the plurality of fluorescent lamps and the plurality of structures; and
light-scattering means for covering the outer case.

34. The backlight unit of claim 33, wherein the respective structures are positioned adjacent to the bent parts of the fluorescent lamps arranged in symmetric with the central line.

35. The backlight unit of claim 33, wherein the fluorescent lamps are formed in shape of U, W or M.

36. The backlight unit of claim 33, further comprising a plurality of inverters including connectors being electrically connected with both electrodes of the respective fluorescent lamps.

37. The backlight unit of claim 36, wherein the both electrodes of the fluorescent lamp are positioned toward the inverter.

38. The backlight unit of claim 33, wherein the conic-shaped structure has a bottom size and a height based upon a size in the bent structure of the fluorescent lamp surrounding the conic-shaped structure, an interval between the bent structures of the fluorescent lamps, and a height of the outer case.

* * * * *